United States Patent
Ennis

[11] Patent Number: 5,946,761
[45] Date of Patent: Sep. 7, 1999

[54] VEHICLE CLEANING ELEMENT

[76] Inventor: G. Thomas Ennis, 235 West Florence Ave., Inglewood, Calif. 90301

[21] Appl. No.: 08/989,892

[22] Filed: Dec. 12, 1997

[51] Int. Cl.[6] .................. A47L 7/02; B60S 3/06
[52] U.S. Cl. .............. 15/230.16; 15/230; 15/230.14; 15/97.3; 15/DIG. 2
[58] Field of Search ............... 15/DIG. 2, 230, 15/230.11, 230.12, 230.14, 230.15, 230.16, 230.17, 230.18, 230.19, 97.3, 215, 217, 238, 244.1

[56] References Cited

U.S. PATENT DOCUMENTS

| | | | |
|---|---|---|---|
| 2,880,436 | 4/1959 | Hayden | 15/244.1 |
| 3,047,897 | 8/1962 | Bartos et al. | 15/230.17 |
| 3,418,673 | 12/1968 | Kruth | 15/118 |
| 3,570,036 | 3/1971 | Gilchrist et al. | 15/244.1 |
| 3,683,441 | 8/1972 | Fromme | 15/97.3 |
| 3,707,012 | 12/1972 | Lane . | |
| 3,912,667 | 10/1975 | Spitzer et al. . | |
| 3,914,818 | 10/1975 | Fromme | 15/97.3 |
| 4,004,316 | 1/1977 | Ali | 15/230.16 |
| 4,203,857 | 5/1980 | Dugan . | |
| 4,264,337 | 4/1981 | Fenster et al. . | |
| 4,547,922 | 10/1985 | Bivens | 15/230 |
| 4,611,359 | 9/1986 | Bivens | 15/230.14 |
| 4,961,243 | 10/1990 | Barber | 15/4 |
| 5,077,859 | 1/1992 | Ennis . | |
| 5,142,727 | 9/1992 | Koester | 15/230.16 |
| 5,623,741 | 4/1997 | Clark | 15/230.16 |

FOREIGN PATENT DOCUMENTS 61-271157  12/1986  Japan .

Primary Examiner—Mark Spisich
Assistant Examiner—Andrew Alday
Attorney, Agent, or Firm—Fay, Sharpe, Beall, Fagan, Minnich & McKee

[57] ABSTRACT

A vehicle washing apparatus which includes a cleaning element having a plurality of cleaning strips attached to a base component and a plurality of deep pile, fur-like inserts mounted between at least some of the cleaning strips. The cleaning strips preferably are made of a foam plastic material having a closed cell structure. The cleaning element may be mounted on a movable support such as a rotatable shaft and a plurality of such cleaning elements mounted on a rotatable shaft constitute a brush.

6 Claims, 3 Drawing Sheets

VEHICLE CLEANING ELEMENT

BACKGROUND OF THE INVENTION

1. Field of the Invention

The present invention relates to an improved vehicle cleaning element and, more particularly, to a cleaning element having a plurality of cleaning strips and a plurality of inserts made of a sound suppressing material mounted between at least some of the cleaning strips.

2. Description of the Prior Art

Numerous devices are known in the art for washing vehicles by employing rotating brush assemblies or other cleaning elements. One such device is described in my U.S. Pat. No. 4,299,003, which describes therein a vehicle washing apparatus which includes a supporting frame, a brush support arm pivotally mounted at one end directly to the frame, a rotatable mount for mounting a rotatable brush at the distal end of the arm and a drive for rotating the brush. The device is illustrated in FIG. 7 which shows a brush assembly having a rotatable shaft 20 which carries a bristle drum having bristles 24 projecting radially outwardly. Other types of rotating brush assemblies use felt strips or plastic foam strips or the like.

One of the problems in using brushes having a plurality of cleaning strips made of a material such as foam plastic is that the foam strips tend to fold over and also slap the vehicle as the brush rotates, thus creating a load noise. In an effort to suppress such noise, prior art devices using a material such as foam plastic cleaning strips have been slowed down in order to stop or suppress the noise and to prevent any damage from the strips, but such a remedy does not provide adequate cleaning of the vehicle.

SUMMARY OF THE INVENTION

It is an object of the present invention to provide a vehicle washing apparatus which avoids the disadvantages of the prior art discussed above by providing a vehicle washing apparatus having a movable support and a cleaning element attached to the support which includes a base component, a plurality of cleaning strips attached to the base component and a plurality of deep pile, fur-like inserts mounted between at least some of the cleaning strips.

A further object of the invention is to provide a vehicle washing apparatus having a rotatable shaft and a brush mounted on the shaft and wherein the brush includes a plurality of foam plastic cleaning strips and a plurality of inserts made of a sound suppressing material mounted at least between some of the cleaning strips.

Another object of the invention is to provide a vehicle washing apparatus having a cleaning element which includes cleaning strips containing an antibacterial agent.

The present invention achieves the above and other objects by providing a vehicle washing apparatus which includes a cleaning element having a plurality of cleaning strips attached to a base component and a plurality of deep pile, fur-like inserts mounted between at least some of the cleaning strips. The cleaning strips preferably are made of a foam plastic material having a closed cell structure. The cleaning element may be mounted on a movable support such as a rotatable shaft and a plurality of such cleaning elements mounted on a rotatable shaft constitute a brush. The deep pile, fur-like-material may be a tufted, monofilament fibrous material which extends outwardly from a fabric layer. Moreover, each of the cleaning strips may be elongated and attached at a central portion thereof to a base component whereby both ends of the cleaning strip extend outwardly to form a U-shaped configuration and a deep pile, fur-like insert is mounted inside the U-shaped configuration. The cleaning strips also may contain an antibacterial agent.

These and other features and advantages of the present invention will become more apparent with reference to the following detailed description and drawings.

DETAILED DESCRIPTION OF THE PREFERRED EMBODIMENTS

Figure 1:
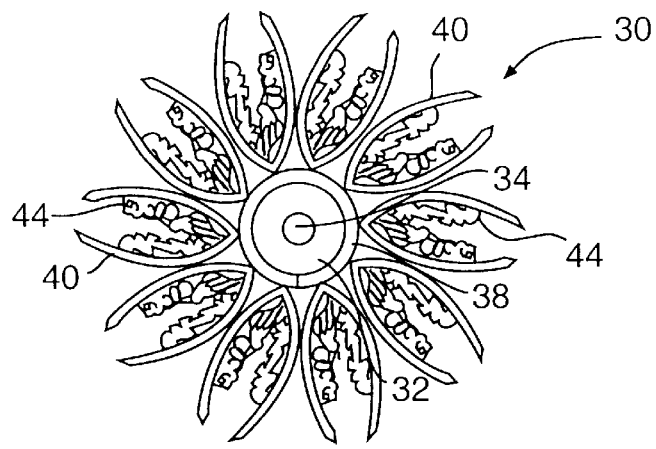
FIG. 1 is a top plan view of a brush of a vehicle washing apparatus containing cleaning elements according to the present invention.
Figure 2:
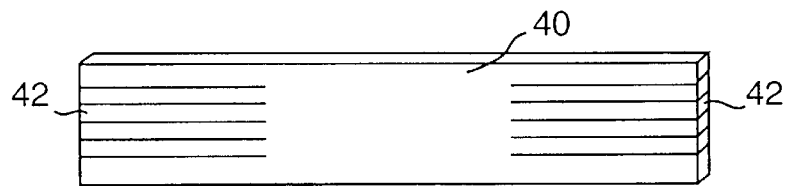
FIG. 2 is a front elevational view of a cleaning strip used in the present invention.

Referring to FIGS. 1–6 of the drawings, a vehicle washing brush, generally referred to by the numeral 30, is shown. The brush includes a brush shaft or hub 32 connected to a rotatable drive shaft 34 and is primarily intended for use with a mechanized vehicle washing apparatus such as that shown in FIG. 7.

Mounted on brush shaft 32 are a plurality of stacked cleaning elements 36. Each cleaning element includes a base component or pad 38 in the form of a belt having a plurality of elongated cleaning strips 40 attached thereto by any suitable means such as staples, glue or rivets. Each of the cleaning strips 40 is elongated and is attached at a central portion thereof to the base component 38 whereby both outer ends of the cleaning strip extend outwardly to form a generally U-shaped configuration. The ends of each cleaning strip 40 preferably are slit to form a plurality of fingers 42. If desired, the fingers may be fashioned in the form of fingers of a human hand. Each cleaning strip 40 may be from one-eighth to one-half of an inch thick.

An insert 44 made of a deep pile, fur-like material is mounted inside the U-shaped configuration of each cleaning strip 40. In a preferred embodiment, each insert 44 is mounted and retained in the U-shaped configuration of each cleaning strip 40 by any suitable means such as staples or rivets which extend through the insert, the cleaning strip, and the base component or belt so that the insert and cleaning strip may be attached in one operation. In a preferred form, each insert is constructed by folding the deep pile, fur-like material over on itself, as shown in FIG. 4B, whereby the deep pile, fur-like side faces to the outside and the backing side is on the inside.

Although each cleaning strip is shown in a generally U-shaped configuration having a pair of legs, each cleaning strip may be comprised of a single element attached at its inner end to the base component or belt 38 and a strip of deep pile, fur-like material may be fastened to each single strip by any suitable means. In addition, although the deep pile, fur-like inserts are shown as being inside of each U-shaped configuration of a cleaning strip, it is also possible to mount the deep pile, fur-like inserts only on certain of the cleaning strips rather than all of the cleaning strips.

The base component or belt 38 preferably is made of polyethylene. The cleaning strips 40 preferably are made of closed cell foam plastic material such as a polyolefin. A suitable polyolefin is polyethylene. More specifically, a suitable foam plastic material is MINICEL sold by Voltek Division of Sekisui America Corp. of Lawrence, Mass. This foam plastic is a cross linked polyethylene having a closed cell structure. The closed cell structure is an extremely fine, smooth cell structure. Other suitable materials such as felt or felt-like material also may be used to make the cleaning strips.

Figure 6:
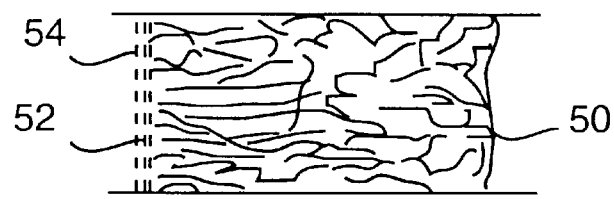
FIG. 6 is an enlarged side elevational view of a piece of deep pile, fur-like material employed in the inserts.
Figure 7:
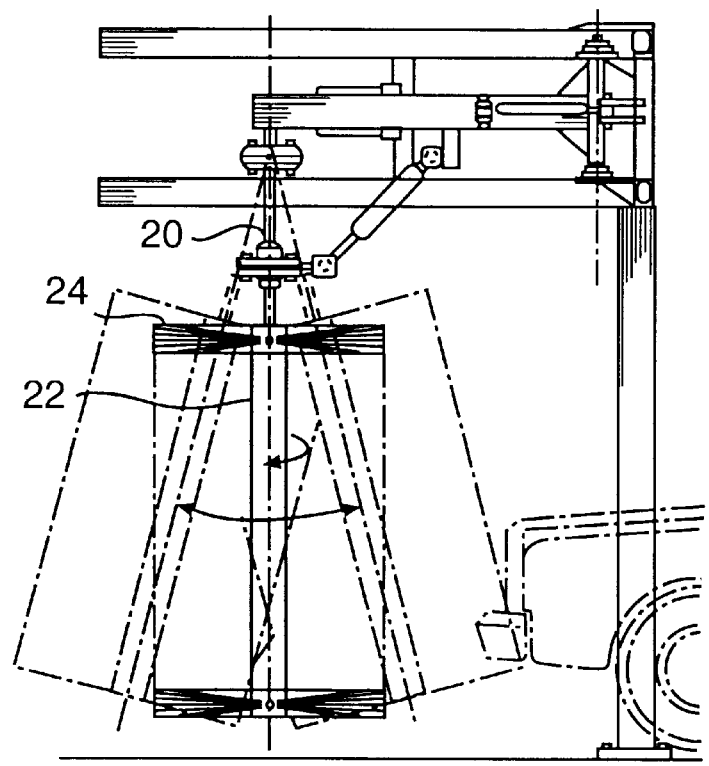
FIGS. 7 is a side elevational view of known vehicle washing apparatus employing a rotating brush.

The inserts 44 preferably are of a deep pile, tufted (randomly oriented) monofilament fibrous material manufactured by Borg Fabrics of New York, N.Y. The fabric is a deep pile material which has a fur-like appearance. The deep pile, fur-like material preferably has a thickness or depth of from one-fourth of an inch to one inch. The fibers of the material are 85% polyester and 15% acrylic. A small section of this material is illustrated in FIG. 6 as a thick cluster of tufted monofilament fibers 50 upstanding from a woven base 52 which provides a fabric layer. The base 52 is made of 100% polyester or other comparable materials. This woven base provides an elastic backing. A non-elastic backing 54 may be applied to the base 52 if desired. The backing 54 may be attached by stitching or by adhesive bonding or other suitable means to the base 52.

Figure 3:
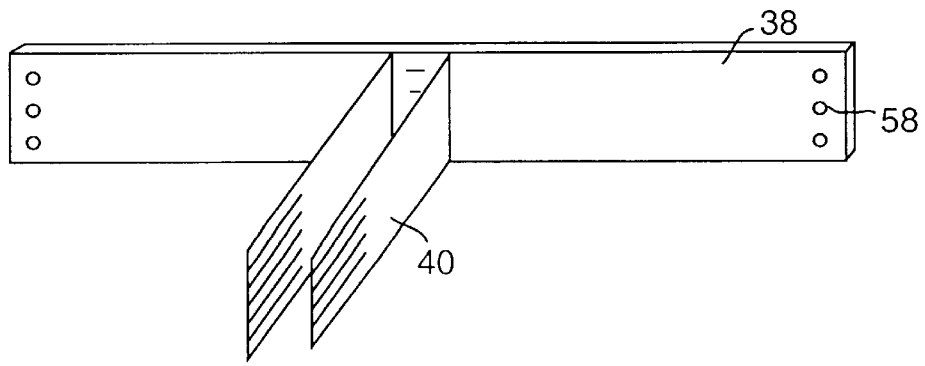
FIG. 3 is a perspective view showing the cleaning strip of FIG. 2 mounted to a base component.
Figure 4A:
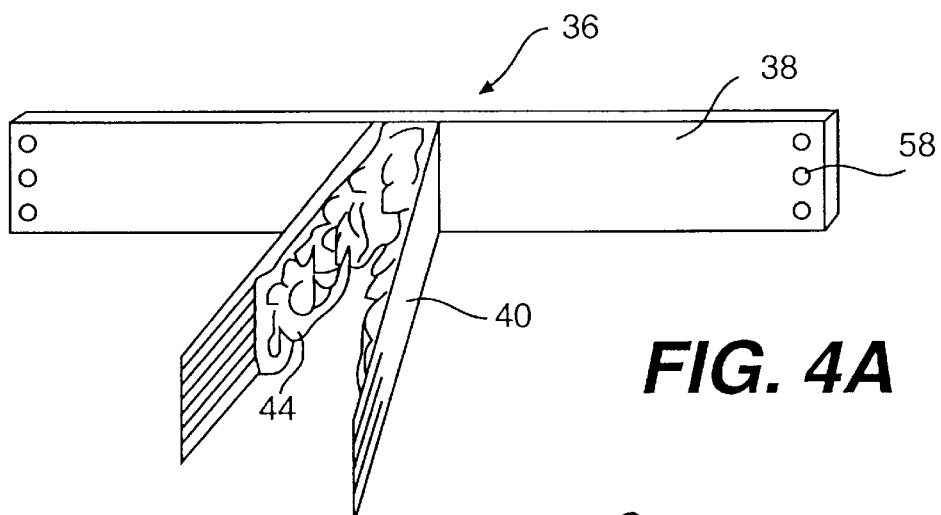
FIG. 4A is a perspective view showing a cleaning strip attached to a base component and having a deep pile, fur-like insert mounted on the inside thereof according to the present invention.
Figure 4B:
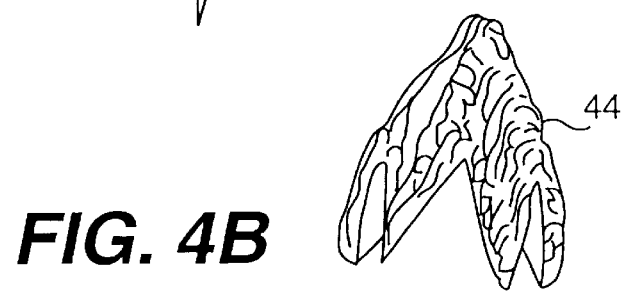
FIG. 4B is a perspective of a deep pile, fur-like insert wherein the insert is formed by folding a piece of the deep pile, fur-like material over on itself.
Figure 5:
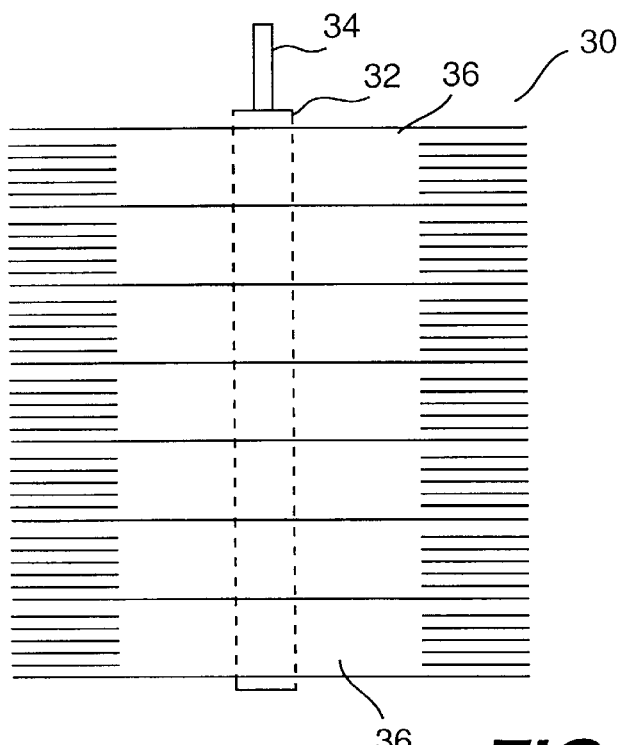
FIG. 5 is a side elevational view of a brush having a plurality of cleaning elements according to the present invention.

In constructing each cleaning element 36 of the present invention, base component or belt 38 is cut to an appropriate length and holes 58 are formed at each end thereof, as shown in FIGS. 3 and 4A. In a preferred manner of constructing the cleaning element, a plurality of cleaning strips 40 having a deep pile, fur-like insert positioned in the center thereof are placed in contact with belt 38 and both the cleaning strip and the insert are then attached to the belt in one operation by suitable fastening means such as stapling. Once the entire belt 58 has been covered on one side with the cleaning strips and inserts, the cleaning element is then attached to brush shaft 32 by being wrapped around the shaft and the ends of the belt preferably are connected together by pop rivets extending through the holes 58. As shown in FIG. 5, a plurality of cleaning elements 36 are placed in stacked relation on brush shaft 32 to form a brush.

The unique construction of the present invention provides several advantages. The use of deep-pile, fur-like inserts mounted to each cleaning strip not only act to suppress the sound when the cleaning strips contact the vehicle, but also adds great stability to each cleaning strip by strengthening its structure so that the strip does not fold up or otherwise become entangled during use. Moreover, the deep pile, fur-like material increases the efficiency of the cleaning of a vehicle.

Numerous other modifications and adaptations of the present invention will be apparent to those skilled in the art and thus, it is intended by the following claims, to cover all such modifications and adaptations which fall within the true spirit and scope of the invention.

Claim:

1. A vehicle washing apparatus comprising:

a rotatable brush having a plurality of cleaning elements;

each said cleaning element comprising:

a base component;

a plurality of foam plastic cleaning strips attached to said base component; and a plurality of deep pile, fur-like material inserts mounted between at least some of said cleaning strips, said inserts functioning as a sound suppressing material.

2. A vehicle washing apparatus according to claim 1 wherein said cleaning strips contain an antibacterial agent.

3. A vehicle washing apparatus according to claim 1 wherein said deep pile, fur-like inserts each comprise a tufted monofilament fibrous material which extends outwardly from a fabric layer.

4. A vehicle washing apparatus according to claim 1, wherein each said foam plastic cleaning strip is comprised of a closed cell foam plastic.

5. A vehicle washing apparatus according to claim 1 wherein each of said cleaning strips is elongated and is attached at a central portion thereof to said base component whereby both ends of each of said cleaning strips extend outwardly to form a U-shaped configuration and a deep pile, fur-like material insert is mounted inside of said U-shaped configuration.

6. A vehicle washing apparatus according to claim 5 wherein each said insert is comprised of a backing having said deep pile, fur-like material attached to one side thereof and wherein each insert is constructed by folding the other side of said backing over on itself whereby the other side of said backing is on the inside of said insert and said deep pile, fur-like material is on the outside of said insert.

\* \* \* \* \*